US012663541B2

(12) United States Patent
    Ichikawa

(10) Patent No.: US 12,663,541 B2
(45) Date of Patent: Jun. 23, 2026

(54) TOUCHING OPERATOR IDENTIFICATION SYSTEM AND INFORMATION PROCESSING SYSTEM

(71) Applicant: ALPS ALPINE CO., LTD., Tokyo (JP)

(72) Inventor: Teiichi Ichikawa, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 75 days.

(21) Appl. No.: 18/775,329

(22) Filed: Jul. 17, 2024

(65) Prior Publication Data

US 2025/0035784 A1 Jan. 30, 2025

(30) Foreign Application Priority Data

Jul. 24, 2023 (JP) ................................. 2023-119910

(51) Int. Cl.
G01S 17/06 (2006.01)
G06F 3/041 (2006.01)
G06F 3/04883 (2022.01)

(52) U.S. Cl.
CPC ............ G01S 17/06 (2013.01); G06F 3/0412 (2013.01); G06F 3/04883 (2013.01)

(58) Field of Classification Search
CPC .... G01S 17/06; G06F 3/0412; G06F 3/04883; G06F 2203/04101; G06F 2203/04108; G06F 3/0416; G06F 3/0421; G06F 3/042; G06F 3/04186
USPC ...................................................... 356/614
See application file for complete search history.

(56) References Cited

U.S. PATENT DOCUMENTS

| | | | |
|---|---|---|---|
| 2011/0043489 A1 | 2/2011 | Yoshimoto et al. | |
| 2021/0232259 A1 | 7/2021 | Ichikawa | |
| 2022/0011877 A1 | 1/2022 | Ichikawa | |
| 2022/0170309 A1* | 6/2022 | Shirashima | ........... E05F 15/614 |

FOREIGN PATENT DOCUMENTS

| | | |
|---|---|---|
| JP | 2007-331692 | 12/2007 |
| JP | 2021-117189 | 8/2021 |

OTHER PUBLICATIONS

Extended European Search Report for EP24188763.7 mailed on Dec. 19, 2024.

* cited by examiner

*Primary Examiner* — Md M Rahman
(74) *Attorney, Agent, or Firm* — IPUSA, PLLC

(57) ABSTRACT

Multiple infrared-light LEDs are aligned in the left-right direction, below the display surface of a display, and the approach position Gx of an object approaching the display surface is calculated from the distribution of the respective intensities of infrared light beams emitted from the LEDs in a front, oblique direction. Based on the horizontal coordinate Tx of a touch position on the touch panel and the approach position Gx, a user in a driver's seat, positioned right of the display, is identified as the touching operator of the touch panel if the approach position Gx is located Th1 or more apart to the right from the coordinate Tx, and a user in a passenger's seat, positioned left of the display, is identified as the touching operator if the approach position Gx is located Th1 or more apart to the left from the coordinate Tx.

7 Claims, 12 Drawing Sheets

TOUCHING OPERATOR IDENTIFICATION SYSTEM AND INFORMATION PROCESSING SYSTEM

CROSS-REFERENCE TO RELATED APPLICATION

The present application claims priority under 35 U.S.C. § 119 to Japanese Patent Application No. 2023-119910, filed Jul. 24, 2023, the entire contents of which are incorporated herein by reference.

BACKGROUND OF THE INVENTION

Field of the Invention

The present invention relates to a technique for identifying the user (operator) operating a touch panel when there are users on the left and right side of the touch panel.

Description of the Related Art

A technology for identifying the user (operator) operating a touch panel when there are users on the left and right side of the touch panel has been known heretofore. Referring to the disassembled view of (a) of FIG. 12, a technology for placing a frame-like optical position detection device 1203 with an opening 12031 on top of a touch panel 1202 that is positioned on a display surface of a display monitor 1201 has been known heretofore (see, for example, patent document 1).

As shown in FIG. 12b, the optical position detection device 1203 has arrays of light emitting diodes 12032 and arrays of photodiodes 12033, both arrays of diodes being positioned opposite each other in the vertical and horizontal directions. When the touch panel is not being operated, infrared light beams emitted from the light emitting diodes 12032 located at respective positions pass through the opening 12031 and are detected by the photodiodes 12033 located at opposite positions. On the other hand, when the touch panel 1202 is touched and operated, the infrared light beam that is emitted from the light emitting diode 12032 situated at the position that the finger touched is blocked by the finger and therefore is not detected by the corresponding photodiode 12033 at the opposite position. When an infrared light beam ceases being detected thus, the optical position detection device 1203 detects the position of the finger from the position of the corresponding photodiode 12033.

As shown in FIG. 12C1, when a user on the right side of the touch panel touches the touch panel, his/her fingertip is usually tilted to the left, and so the horizontal coordinate X1 of the position that the user touches and is detected by the touch panel is to the left of the horizontal coordinate X2 of the position of the user's finger detected by the optical position detection device 1203. Also, as shown in FIG. 12C2, when a user on the left side of the touch panel touches the touch panel, his/her fingertip is usually tilted to the right, and so the horizontal coordinate X1 of the position that the user touches and is detected by the touch panel is to the right of the horizontal coordinate X2 of the position of the user's finger detected by the optical position detection device 1203. Based on this, when there are users on the left and right side of the touch panel 1202, the technology identifies which user is touching the touch panel 1202 based on the relationship between the horizontal coordinate X1 of the position touched and detected by the touch panel 1202 and the horizontal coordinate X2 of the position of the user's finger detected by the optical position detection device 1203.

Also, another technology related to the present application, namely a detection system in which multiple LEDs are positioned below a display, along a lower side of the display, emit infrared light beams forward and diagonally upward, and are turned on sequentially, has been known heretofore. In this detection system, multiple photodiodes positioned along a lower side of the display detect reflected light beams of infrared light beams, reflected by an object that is targeted for detection, and detect the horizontal position (the position in the left-right direction) of the object when it approaches the display surface of the display from the distribution of the reflected light beams' respective intensities detected when each corresponding LED is turned on (see, for example, patent document 2).

RELATED-ART DOCUMENT

Patent Document

[Patent Document 1] Unexamined Japanese Patent Application Publication No. 2007-331692
[Patent Document 2] Unexamined Japanese Patent Application Publication No. 2021-117189

SUMMARY OF THE INVENTION

Problem to be Solved by the Invention

There are instances in which, in order to prevent a user from blocking the content on a display monitor with his/her fingers or hand, the user touches the touch panel such that his/her finger is approximately perpendicular to the touch surface of the touch panel. In this case, according to the above-described technology using the optical position detection device 1203, as shown in (d) of FIG. 12, the horizontal coordinate X1 of the position that the user touches and is detected by the touch panel 1202 and the horizontal coordinate X2 of the position of the user's finger detected by the optical position detection device 1203 are approximately equal. This, then, makes it no longer possible to identify, when there are users on the left and right side of the touch panel, which user touched the touch panel.

It is therefore an object of the present invention to identify, when there are users on the left and right side of a touch panel, which user is touching the touch panel, under a variety of circumstances, regardless of the manner of the touch.

Means for Solving the Problem

In order to achieve the above object, the present invention provides a touching operator identification system for identifying a user touching a touch panel, the touch panel being placed on top of a display surface of a display and configured to detect, as a touch position, a position on the touch panel where the user touches. The touching operator identification system includes: an approach detection device configured to detect an object approaching the display surface of the display; and a user identification part configured to identify the user touching the touch panel. The approach detection device includes: a plurality of light sources positioned side by side in a left-right direction of the display surface, outside the display surface, and configured to emit non-visible light beams forward with respect to the display surface; an optical detector configured to detect reflected light beams of the non-visible light beams emitted from the plurality of light sources; and a reference position calculation part configured to calculate, as a reference left-right position, a coordinate of the approaching object on the display surface, with respect to the left-right direction of the display surface, based on a distribution of respective intensities of the reflected light beams of the non-visible light beams detected by the optical detector. Upon occurrence of a touch event in which the user touches the touch panel, the user identification part determines whether the user is a user on a left side of the display or a user on a right side of the display, based on a positional relationship and a distance in the left-right direction of the display surface between: a touch position in the touch event in the left-right direction of the display surface, the touch position giving a coordinate of the touch position detected by the touch panel, with respect to the left-right direction of the display surface; and the reference left-right position calculated by the reference position calculation part.

Now, in the above touching operator identification system, the reference position calculation part in the approach detection device may be configured to: derive, from a first distribution of respective intensities of the reflect light beams of the non-visible light beams, a second distribution in which the intensities of the reflect light beams in the first distribution are corrected such that a magnitude relationship among the intensities of the reflected light beams is maintained as in the first distribution, and a greater intensity in the first distribution is reduced at a greater rate in the second distribution; and calculate, as a reference light-left position, a coordinate of a center of gravity in the second distribution with respect to the left-right direction of the display surface.

Furthermore, in the above touching operator identification system, the user identification part may be configured to: determine that the user is the user on the left side of the display if the reference left-right position is located a predetermined distance or more apart to left from the touch position in the touch event; and determine that the user is the user on the right side of the display if the reference left-right position is located the predetermined distance or more apart to right from the touch position in the touch event.

Furthermore, in the above touching operator identification system, when the touch position in the touch event in the left-right direction of the display surface is located in a middle area in a left-right direction of the display, the user identification part may be configured to: determine that the user is the user on the left side of the display if the reference left-right position is located a first distance or more apart to left from the touch position in the touch event; and determine that the user is the user on the right side of the display if the reference left-right position is located the first distance or more apart to right from the touch position in the touch event. When the touch position in the touch event is located in a left part in the middle area of the display, the user identification part may be further configured to: determine that the user is the user on the left side of the display if the reference left-right position is located a second distance or more apart to left from the touch position in the touch event; and determine that the user is the user on the right side of the display if the reference left-right position is located a third distance, which is greater than or equal to the second distance, apart from the touch position in the touch event. When the user's position is located in a right part in the middle area of the display, the user identification part may be further configured to: determine that the user is the user on the left side of the display if the reference left-right position is located the second distance or more apart to right from the touch position in the touch event; and determine that the user is the user on the right side of the display if the reference left-right position is located the third distance or more apart from the touch position in the touch event.

Alternatively, in the above touching operator identification system, the user identification part may be configured to: set a first reference position and a second reference position based on the touch position in the touch event in the left-right direction of the display surface; determine that the user is the user on the left side of the display if the reference left-right position is located on a left side with respect to the first reference position; and determine that the user is the user on the right side of the display if the reference left-right position is located on a right side with respect to the second reference position. The user identification part may be further configured to set the first reference position such that: if a position relative to the touch position in the touch event is defined as a relative position and the touch position in the touch event is located near a left edge of the display, a first relative position that is a first distance apart to right from the touch position in the touch event serves as the relative position; if the touch position in the touch event is located near a right edge of the display, a second relative position that is a second distance, which is greater than the first distance, apart to right from the touch position in the touch event serves as the relative position; and if the touch position in the touch event is located between the left edge and the right edge of the display, the relative position gets nearer to the first relative position as the relative position gets nearer to the left edge of the display, and gets nearer to the second relative position as the relative position gets nearer to the right edge of the display. The user identification part may be further configured to set the second reference position such that: if the touch position in the touch event is located near the right edge of the display, a third relative position that is the first distance apart to left from the touch position in the touch event serves as the relative position; if the touch position in the touch event is located near the left edge of the display, a fourth relative position that is the second distance apart to right from the touch position in the touch event serves as the relative position; and if the touch position in the touch event is located between the left edge and the right edge of the display, the relative position gets nearer to the third relative position as the relative position gets nearer to the right edge of the display, and gets nearer to the fourth relative position as the relative position gets nearer to the left edge of the display.

Furthermore, in the above touching operator identification system, the display may be located between a driver's seat and a passenger's seat in a car, with respect to a left-right direction of the car, and the user on the left side of the display may be one of a user seated in the driver's seat or a user seated in the passenger's seat, and the user on the right side of the display may be the other user.

The present invention also provides an information processing system including: the above touching operator identification system; the display; the touch panel; and a data processing device configured to use the display to display an output and use the touch panel to input a position. In this information processing system, the touching operator identification system is further configured to report the identified user to the data processing device. The data processing device is further configured to perform a process according to the touch position in the touch event detected by the touch panel, and to switch details of at least a part of the process performed according to the touch position in the touch event, depending on the user identified by and reported from the touching operator identification system, to the data processing device.

The present invention also provides an information processing system including the above touching operator identification system; the display; the touch panel; and a data processing device configured to use the display to display an output and use the touch panel to input a position. In this information processing system, the touching operator identification system is further configured to report the reference left-right position and the identified user to the data processing device. The data processing device includes: a gesture response processing part configured to recognize a gesture that the user makes in front of the display surface of the display, from the reference left-right position, and perform a process according to the gesture recognized; and a touch response processing part configured to perform a process according to the touch position in the touch event detected by the touch panel. The touch response processing part is further configured to switch details of at least part of the process performed according to touch position in the touch event, depending on the user identified by and reported from the touching operator identification system, to the data processing device.

According to the above-described touching operator identification system, the reference position in the left-right direction, calculated by the approach detection device, and the touch position in the left-right direction, detected by the touch panel, are compared, so that whether the user operating the touch panel is the user on the left side of the display or the user on the right side of the display can be determined. Here, the approach detection device is configured to detect the approaching object based on reflected light beams of non-visible light beams emitted forward from the display surface of the display, so that the reference position in the left-right direction, calculated from the distribution of the reflected light beams' respective intensities, includes a deviation in the direction of the user touching and operating the touch panel from the touch position in the left-right direction, due to the impact of reflection by the arm that the user reaches out to the display surface from the side where he/she is located when touching and operating the touch panel. Therefore, it is possible to accurately identify the user touching and operating the touch panel, regardless of the manner of the touch, such as the angle of the user's finger when he/she operates the touch panel.

Advantageous Effects of the Invention

As described above, according to the present invention, it becomes possible, under a variety of circumstances, to identify which of the users on the left and right side of the touch panel is touching the touch panel, regardless of the manner of the touch.

6

Figure 4:
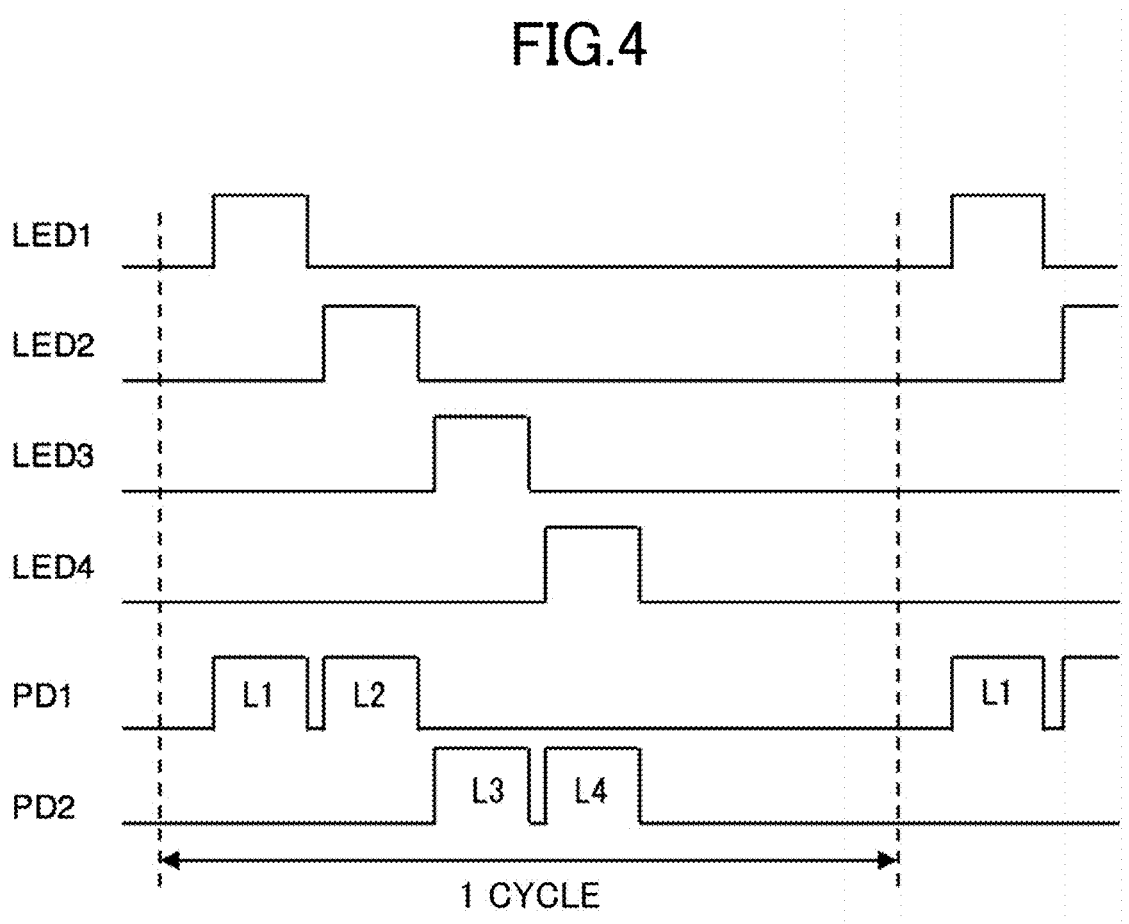
Figure 5:
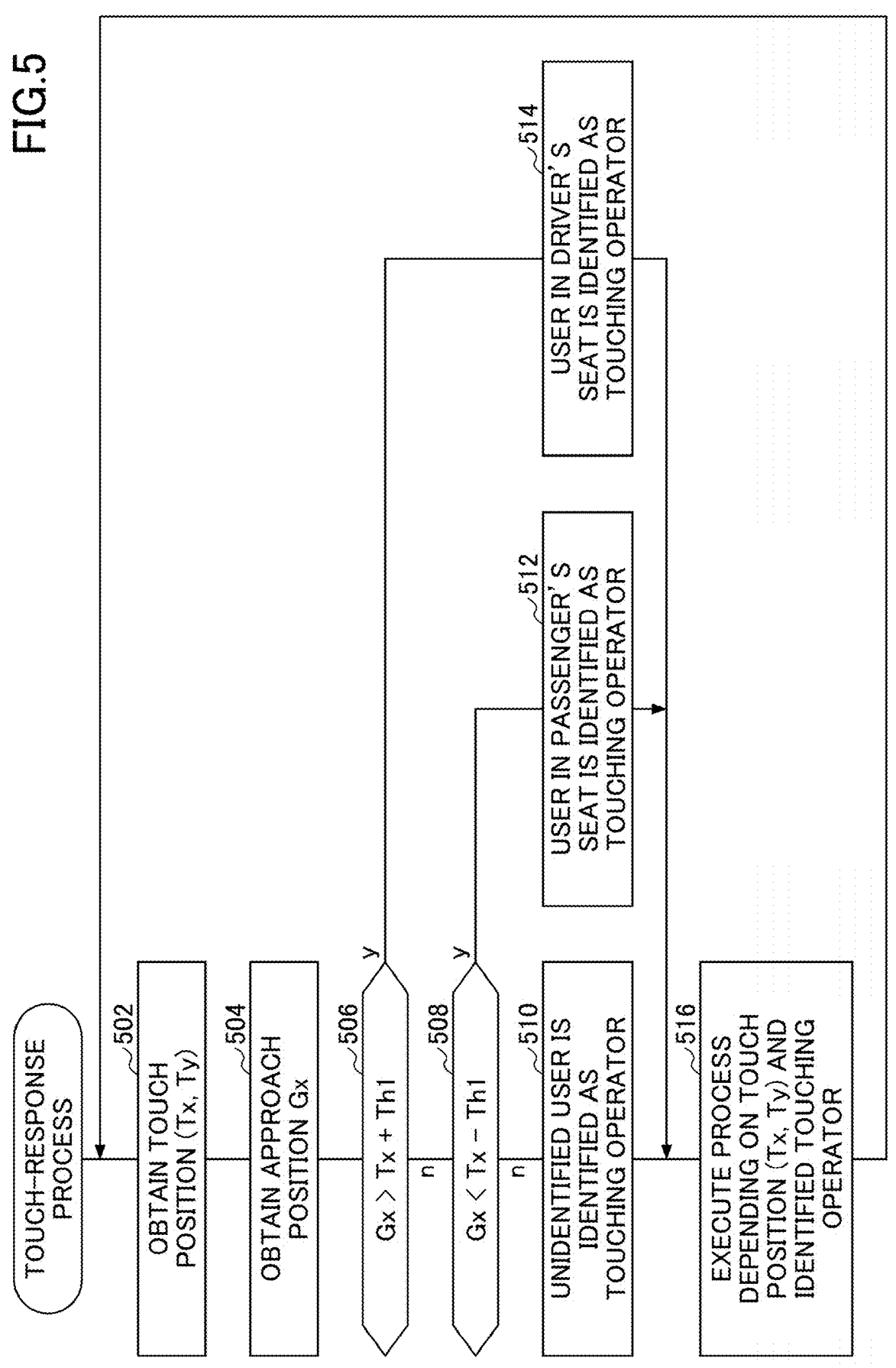
Figure 6:
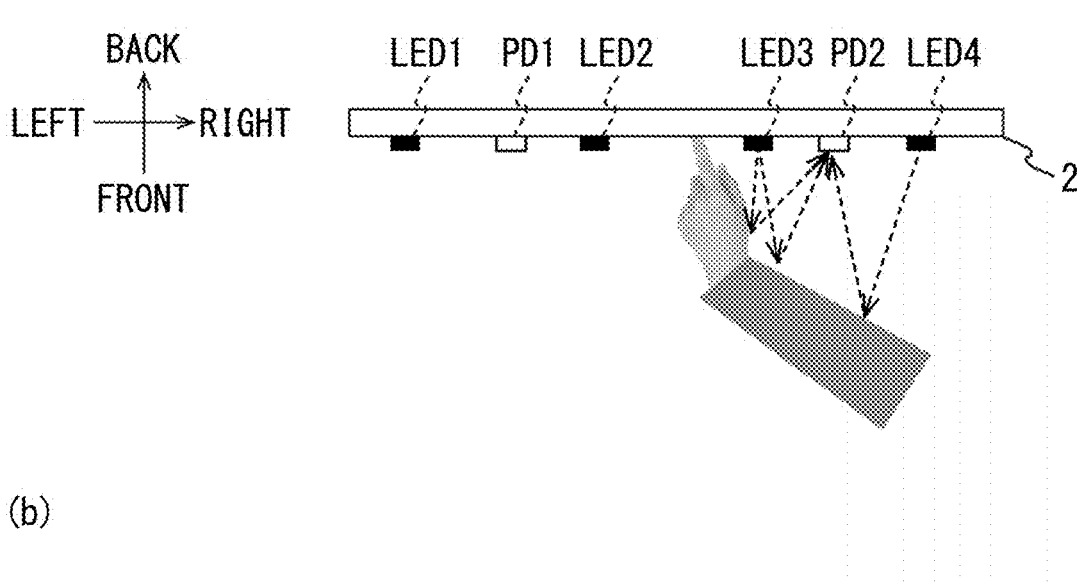
Figure 6:
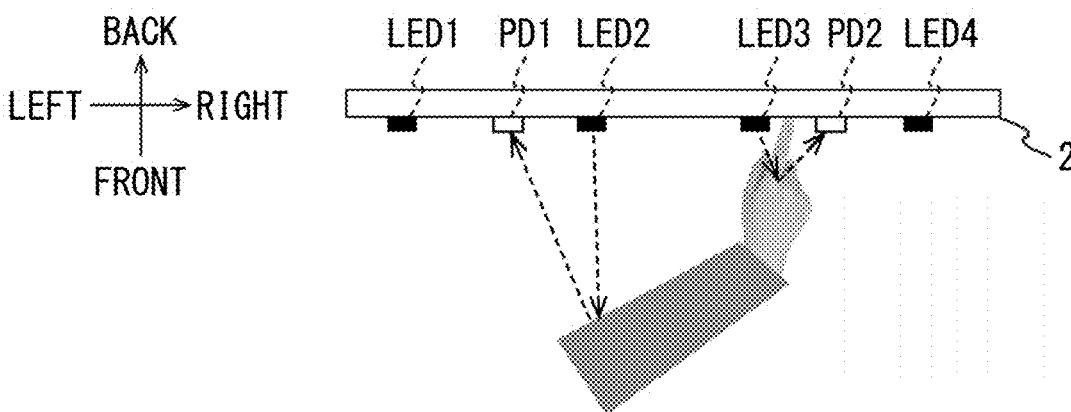
Figure 7:
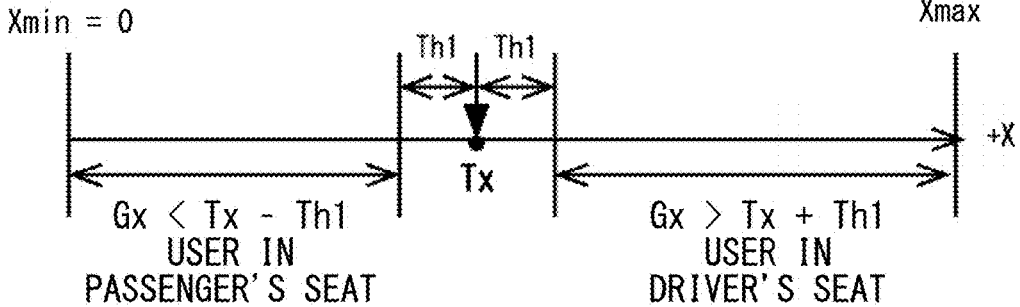
Figure 7:
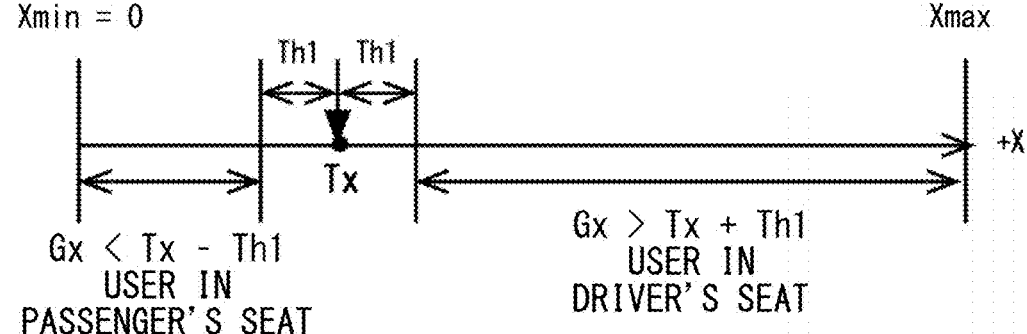
Figure 7:
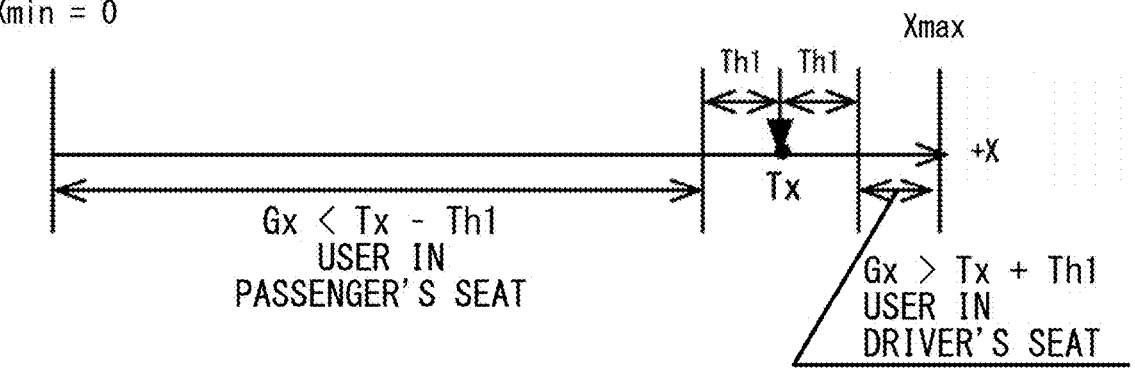
Figure 8:
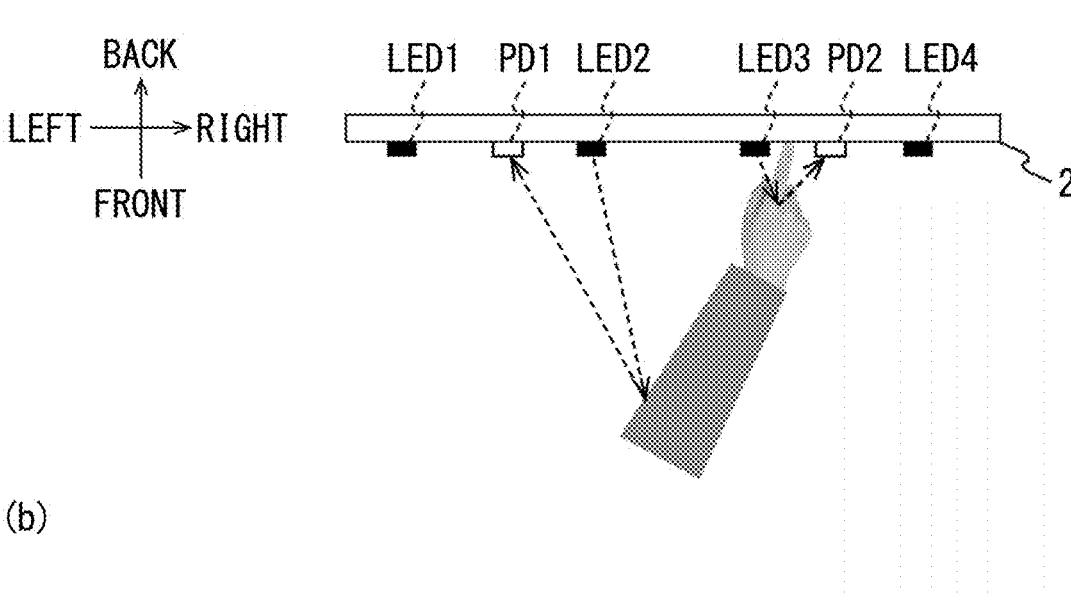
Figure 8:
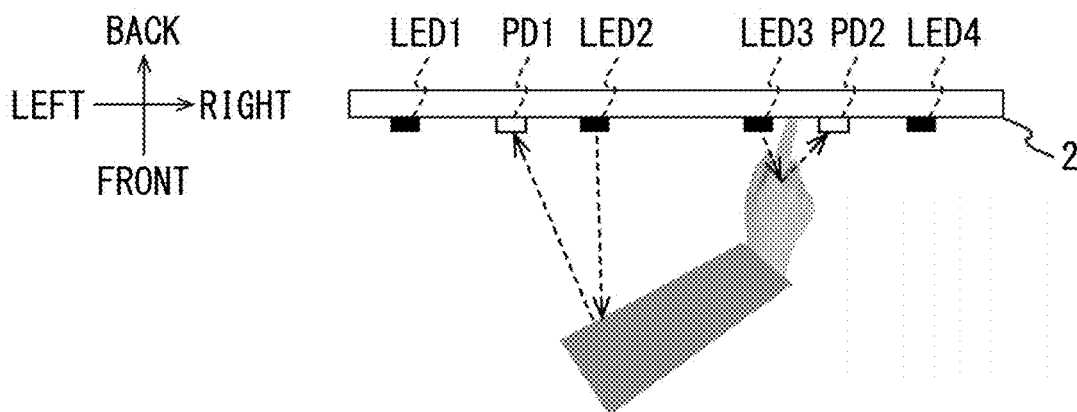
Figure 9:
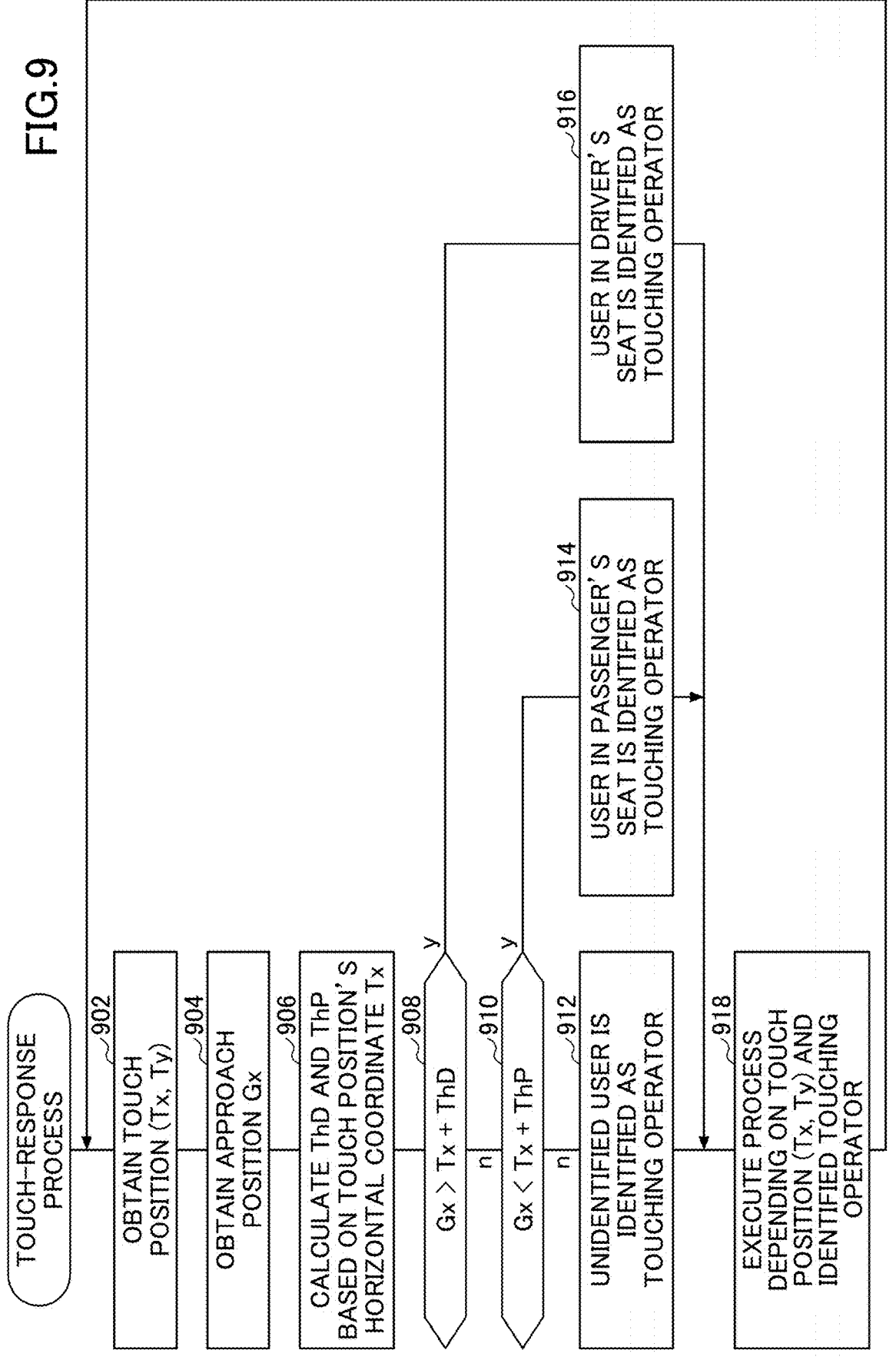
Figure 11:
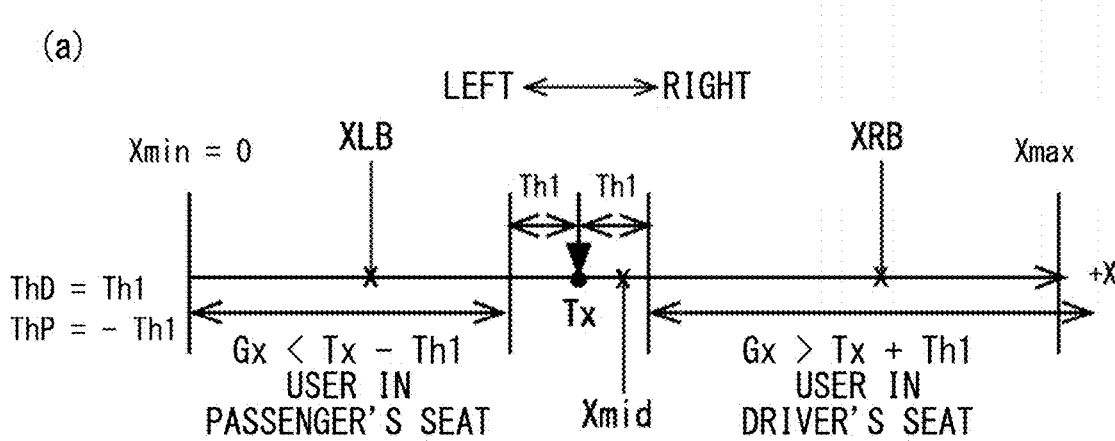
Figure 11:
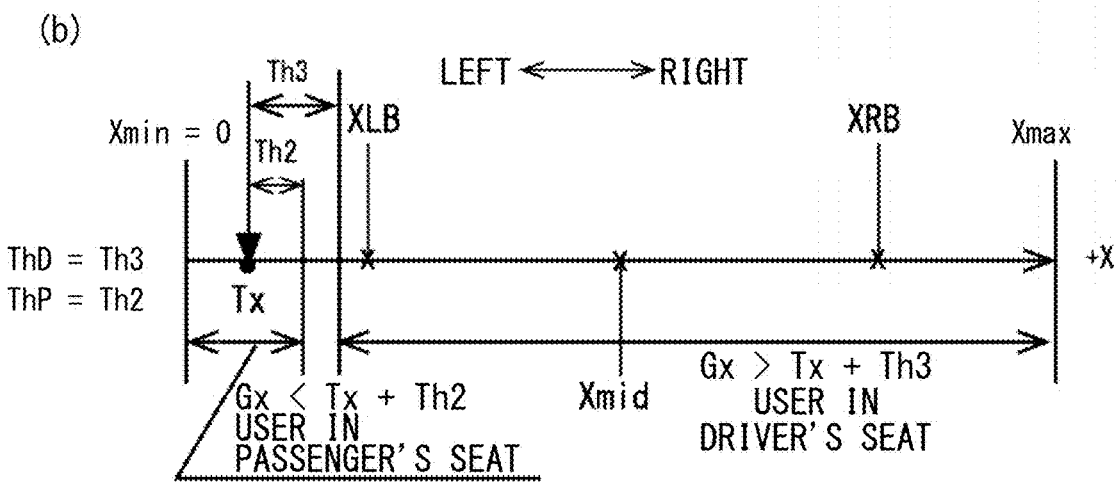
Figure 11:
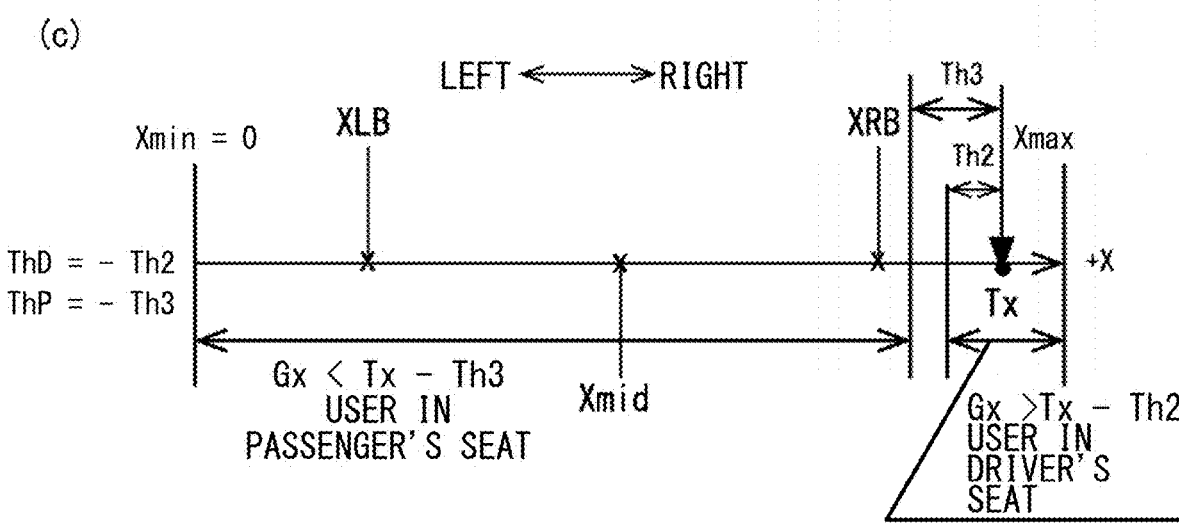
Figure 12:
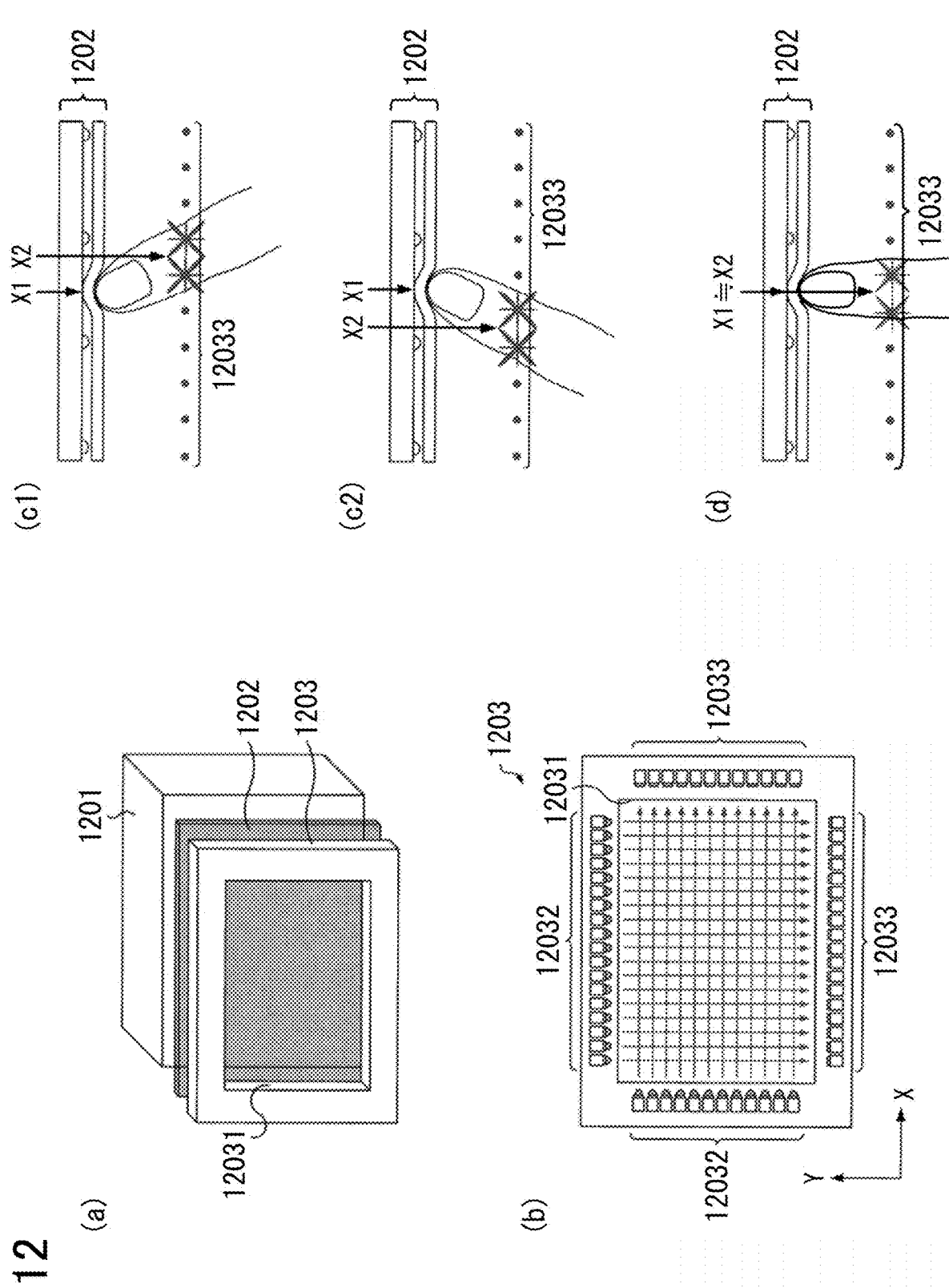

FIG. 4 shows an example operation sequence of the approach detection sensor according to the first embodiment of the present invention;

FIG. 5 is a flowchart showing an example of a touch-response process according to the first embodiment of the present invention;

FIG. 6 shows example mechanisms of operator identification according to the first embodiment of the present invention;

FIG. 7 shows examples of the touch-response process according to the first embodiment of the present invention;

FIG. 8 shows example mechanisms of operator identification according to a second embodiment of the present invention;

FIG. 9 is a flowchart showing an example of a touch-response process according to a third embodiment of the present invention;

Figure 10:
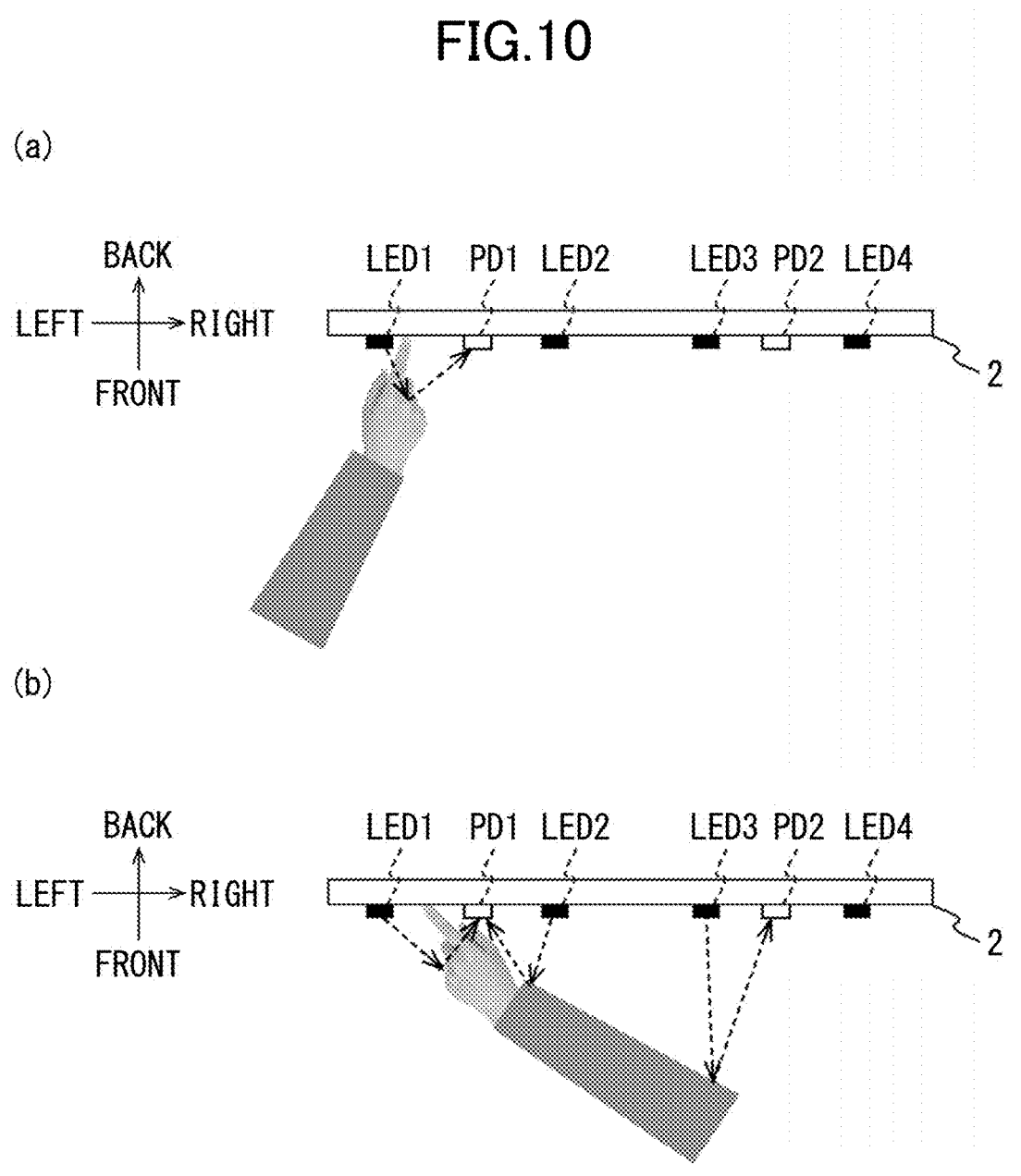

FIG. 10 shows example mechanisms of operator identification according to the third embodiment of the present invention;

FIG. 11 shows examples of the touch-response process according to the third embodiment of the present invention; and FIG. 12 shows techniques according to related-art documents.

DETAILED DESCRIPTION OF THE DISCLOSURE

Hereinafter, embodiments of the present invention will be described based on examples in which each embodiment is applied to a right-hand drive car in which the driver's seat is on the right side and the passenger's seat is on the left side. However, embodiments of the present invention can be applied to a left-hand drive car in which the driver's seat is on the left side and the passenger's seat is on the right side as well, in which case only "left" and "right" in the following description need to be switched.

Figure 1:
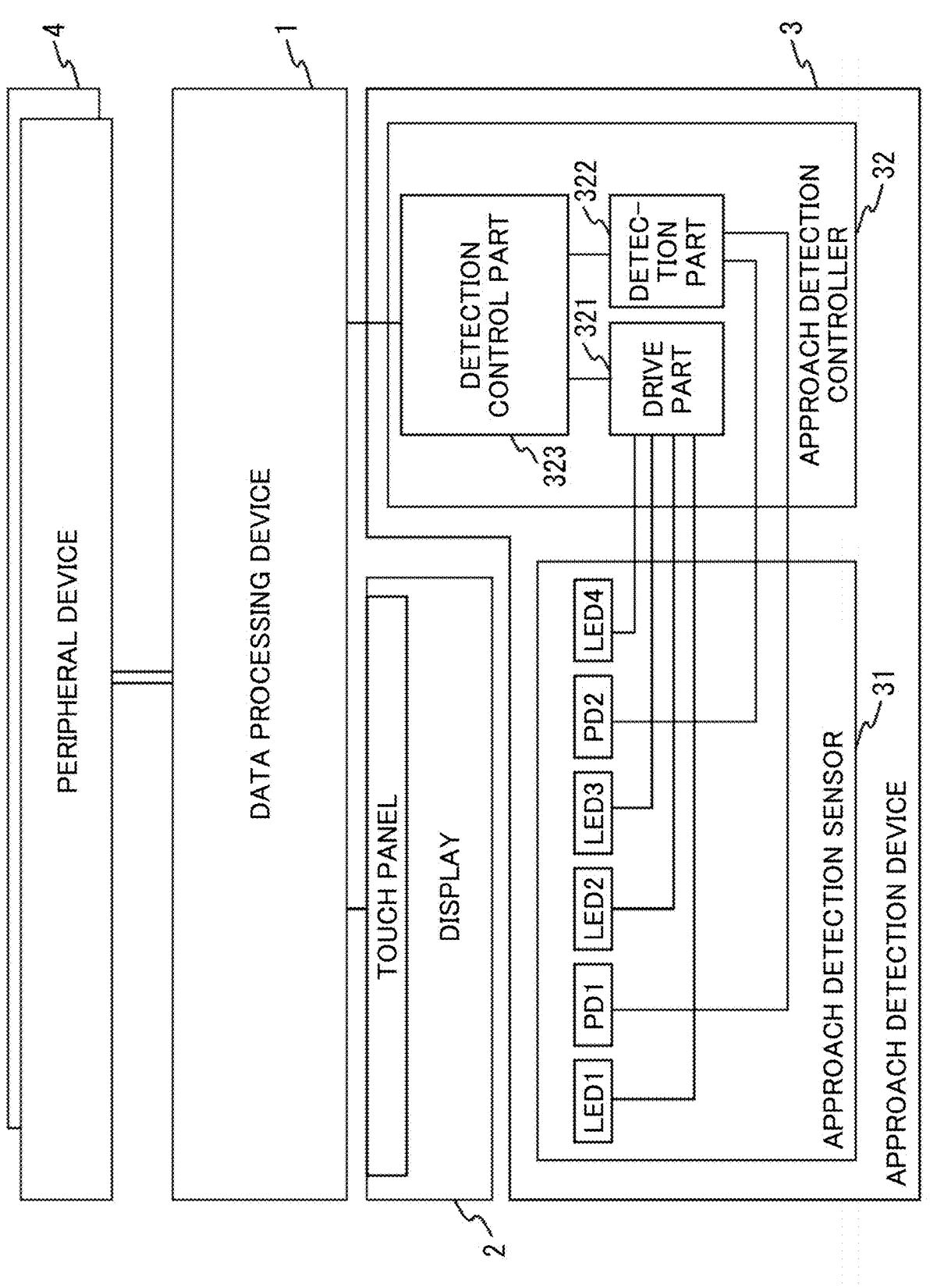
FIG. 1 is a block diagram showing an information processing system according to a first embodiment of the present invention.

A first embodiment will be described below. FIG. 1 shows a structure of an information processing system according to the first embodiment. The information processing system is a system to be installed in a car and includes: a data processing device 1 that runs car navigation applications, media player applications, etc.; a display 2 with a touch panel that the data processing device 1 uses to display images and input coordinates; an approach detection device 3; and other peripheral devices 4 for use by the data processing device 1.

Figure 2:
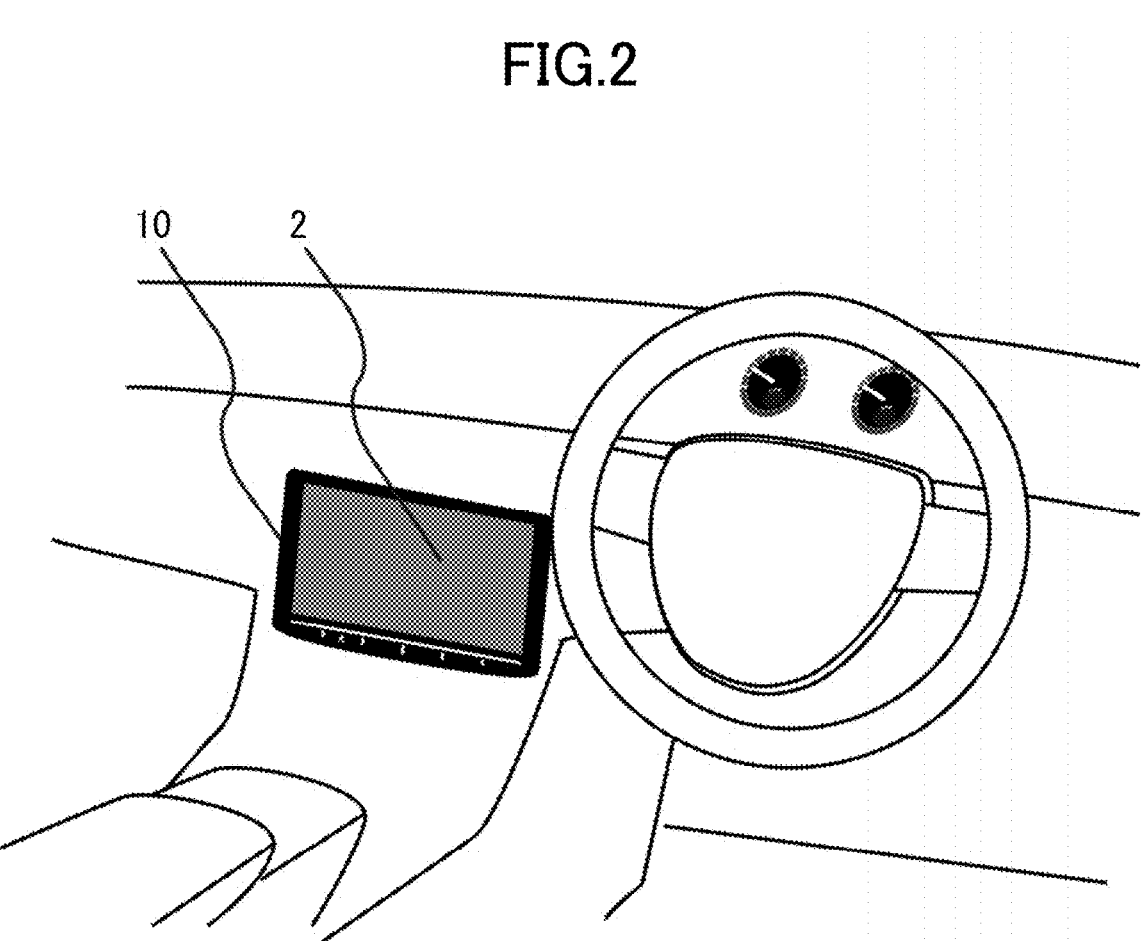
FIG. 2 shows an example of positioning of a display according to the first embodiment of the present invention.

As shown in FIG. 2, the display 2 is provided in the form of a display unit 10 that is integrated with the approach detection device 3, and positioned on the dashboard of the car between the driver's seat and the passenger's seat such that the display surface faces the rear of the car. Referring back to FIG. 1 in which a user's hand, finger or the like is an object to be detected, the approach detection device 3 detects the horizontal coordinate of the object when it approaches the display surface of the display 2, and provides the coordinate to the data processing device 1 as an approach position. The data processing device 1 performs a process according to the approach position provided.

The approach detection device 3 is equipped with an approach detection sensor 31 and an approach detection controller 32. The approach detection sensor 31 includes: four infrared light LEDs, namely LED1, LED2, LED3, and LED4; and two photodiodes that detect infrared light beams, namely PD1 and PD2. In addition, the approach detection controller 32 includes: a drive part 321 that drives LED1, LED2, LED3, and LED4 to emit infrared light beams; a detection part 322 that converts electric signals output from PD1 and PD2 into intensity signals that represent the intensity of infrared light beams incident on PD1 and PD2, and outputs the converted signals; and a detection control part 323 that controls the operation of the drive part 321 and the detection part 322, calculates the horizontal coordinate of the object approaching the display surface of the display 2 from the intensity of infrared light beams represented by the intensity signals obtained through conversion at the detection part 322, and reports the approach position to the data processing device 1.

Figure 3:
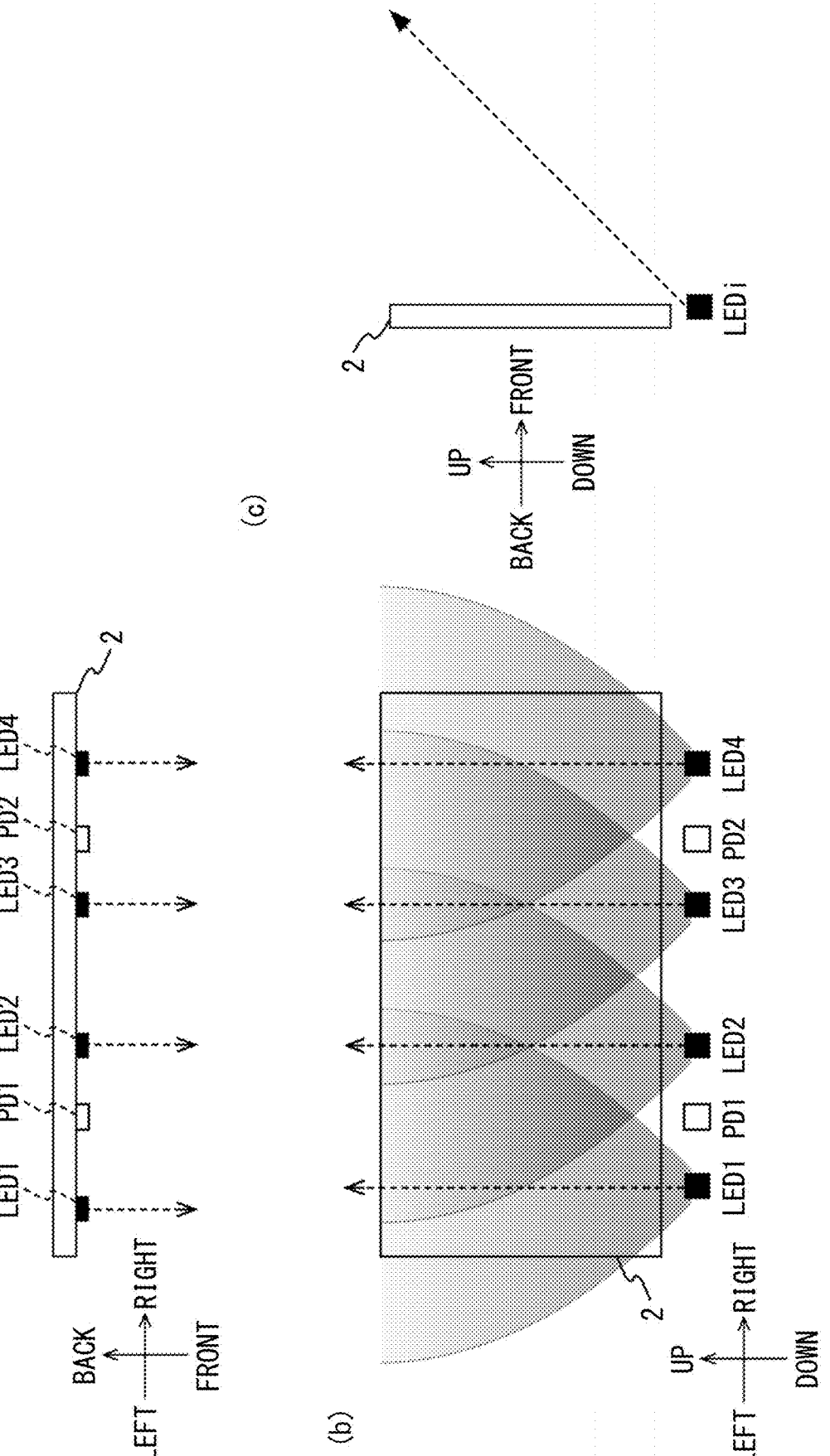
FIG. 3 shows an example of positioning of an approach detection sensor according to the first embodiment of the present invention.

Next, as shown in (a), (b), and (c) of FIG. 3, LED1, LED2, LED3, and LED4 are positioned from left to right in order, at substantially equal intervals, at positions slightly below the lower side of the display 2. In addition, PD1 is positioned halfway between LED1 and LED2, converts the reflected infrared light beams incident on it into electric signals, and outputs these electric signals. PD2 is positioned halfway between LED3 and LED4, converts the reflected infrared light beams incident on it into electric signals, and outputs these electric signals. The arrows in (a) and (b) of FIG. 3 represent the central axes of the respective directivity angles of LED1, LED2, LED3, and LED4. LED1, LED2, LED3, and LED4 emit infrared light beams obliquely toward the upper front of the display 2. Next, the detection control part 323 of the approach detection controller 32 controls the operations of the drive part 321 and the detection part 322 such that the cycle shown in FIG. 4 is repeated. Here, each cycle includes: a period, in which the drive part 321 causes LED1 alone to emit a light beam, and in which the detection part 322 outputs an intensity signal L1 that represents the intensity of the infrared light beam incident on PD1; a period, in which the drive part 321 causes LED2 alone to emit a light beam, and in which the detection part 322 outputs an intensity signal L2 that represents the intensity of the infrared light beam incident on PD1; a period, in which the drive part 321 causes LED3 alone to emit a light beam, and in which the detection part 322 outputs an intensity signal L3 that represents the intensity of the infrared light beam incident on PD2; and a period, in which the drive part 321 emits LED4 alone to emit a light beam, and in which the detection part 322 outputs an intensity signal L4 that represents the intensity of the infrared light beam incident on PD2.

The detection control part 323 detects that an object is approaching when, for example, one of the intensity signals L1, L2, L3, and L4 shows a maximum value that exceeds a predetermined threshold; the detection control part 323 then sends a notice to the data processing device 1. Furthermore, assuming that x1 is the horizontal coordinate of LED1, x2 is the horizontal coordinate of LED2, x3 is the horizontal coordinate of LED3, and x4 is the horizontal coordinate of LED4, the detection control part 323 calculates the horizontal coordinate that is determined as the center of gravity in the distribution of the respective intensities of the intensity signals L1, L2, L3, and L4 detected by the detection part 322, as an approach position Gx, by using the following mathematical expression 1:

(Mathematical expression 1)

$$Gx = (X1 \times L1 + X2 \times L2 + X3 \times L3 + X4 \times L4)/(L1 + L2 + L3 + L4)$$

When the approach of an object that is subject to detection is reported from the approach detection controller 32, the data processing device 1 obtains the approach position Gx calculated by the approach detection controller 32, and performs a predetermined process according to the approach position Gx. The predetermined process may be, for example: a process for enlarging and displaying the icon located at the position on the display corresponding to the approach position Gx; a process for recognizing the gesture of a hand in space from change of the approach position Gx over time; and a process for switching the screen display or application according to the recognized hand gesture.

Referring back to FIG. 1, when the touch surface of the touch panel of the display 2 is touched, the touch panel detects the position of the touch (Tx, Ty), which is the coordinates of the touched position, and reports the occurrence of the touch to the data processing device 1. Here, "Tx" in the touch position (Tx, Ty) is the horizontal coordinate, and "Ty" is the vertical coordinate.

When the occurrence of the touch is reported, the data processing device 1 performs a touch-response process to execute a process in response to the touch on the touch panel. FIG. 5 shows the flow of this touch-response process. In the following description, the coordinate system in which the horizontal coordinate Tx of the touch position on the touch panel is detected and the horizontal coordinate system in which the approach detection controller 32 calculates the approach position Gx in the horizontal direction are the same coordinate system. The positive direction in this coordinate system runs from left to right. As shown in the drawing, in the touch-response process, the touch position (Tx, Ty) is first obtained from the touch panel (step 502). Also, the approach position Gx calculated by the approach detection controller 32 is obtained (step 504). Then, whether Gx>Tx+Th1 is satisfied is determined (step 506). Th1 is a predetermined reference value, where Th1>0 holds. If Gx>Tx+Th1 is satisfied (step 506), the user in the driver's seat is identified as the touching operator (step 514). On the other hand, if Gx>Tx+Th1 is not satisfied (step 506), whether Gx<Tx−Th1 is satisfied is determined (step 508). If Gx<Tx−Th1 is satisfied (step 508), the user in the passenger's seat is identified as the touching operator (step 512). On the other hand, if Gx<Tx−Th1 is not satisfied either (step 508), an unidentified user is identified as the touching operator (step 510). Then, a process is executed according to the touch position (Tx, Ty) and the touching operator identified in one of steps 510, 512, and 514 (step 516). Then, the process returns to step 502. In step 516, assume, for example, that the touch position (Tx, Ty) on the display 2 shows an icon for entering a command for executing a predetermined action, and that the user in the driver's seat is not allowed to operate this icon while driving the car. If the car is not running at present, this action is executed; if the car is running at present, the action is executed only when the user in the passenger's seat is identified as the operator. If an unidentified user or the user in the driver's seat is identified as the operator, the action is not executed.

Here, as shown in (a) of FIG. 6, when the user in the driver's seat on the right side of the display 2 touches the touch panel, the arm of the user in the driver's seat reaches out from the right toward the touch position. Due to the impact of the light beams reflected by the arm, the approach position Gx calculated by the approach detection controller 32 assumes a position that is shifted significantly to the right from the horizontal coordinate Tx of the position that the user touches and is detected by the touch panel.

Also, as shown in (b) of FIG. 6, when the user in the passenger's seat on the left side of the display 2 touches the touch panel, the arm of the user in the passenger's seat reaches out toward the touch position from the left. Due to the impact of light beams reflected by the arm, the approach position Gx calculated by the approach detection controller 32 is found at a position that is shifted significantly to the left from the horizontal coordinate Tx of the position that the user touches and is detected by the touch panel.

Here, (a), (b), and (c) in FIG. 7 each reference the above touch-response process and show the range of the approach position Gx in which the user in the driver's seat is identified as the touching operator, and the range of the approach position Gx in which the user in the passenger's seat is identified as the touching operator, relative to the horizontal coordinate Tx of the touch position. In the drawing, "Xmin" is the minimum value of the touch position's horizontal coordinate Tx, and "Xmax" is the maximum value of the touch position's horizontal coordinate Tx. In the present embodiment, Xmin=0.

Referring to the drawing, when the approach position Gx is located Th1 or more apart to the right from the touch position's horizontal coordinate Tx, the user in the driver's seat is identified as the touching operator. Likewise, when the approach position Gx is located Th1 or more apart to the left from the touch position's horizontal coordinate Tx, the user in the passenger's seat is identified as the touching operator.

Therefore, the above-described touch-response process makes it possible to correctly determine the true operator who touched the touch position. The first embodiment of the present invention has been described above. According to the first embodiment, the approach position Gx that is calculated by the approach detection device 3 and the coordinate Tx of the position that the user touches and is detected by the touch panel are compared, thereby determining whether the user touching and operating the touch panel is the user on the left side of the display 2 or the user on the right side of the display 2. In addition, the approach position Gx calculated by the approach detection device 4 from the distribution of the respective intensities of reflected light beams of non-visible light beams emitted forward from the display surface of the display 2 includes a deviation in the direction of the user touching and operating the touch panel from the touch position coordinates Tx, due to the impact of reflection by the user's arm extending in front of the display surface from the side where he/she is located when touching and operating the touch panel. Therefore, according to the first embodiment, it is possible to identify the user touching and operating the touch panel, regardless of the manner of the touch, such as the angle of the user's finger touching the touch panel.

Next, a second embodiment of the present invention will be described. The second embodiment is different from the first embodiment only in the operation related to setting the touching operator. As shown in (a) of FIG. 8, when a user touches the touch panel by reaching out his/her arm in a direction that is substantially perpendicular to the display surface of the display 2, the ratio of the intensity of reflected light beams arriving at the approach detection sensor 31 from the user's arm to the intensity of reflected light beams arriving at the approach detection sensor 31 from the user's hand or finger, which is located closer to the display surface of the display 2 than his/her arm, becomes lower. Consequently, as shown in (b) of FIG. 8, the position calculated as the approach position Gx is close to the horizontal coordinate Tx of the touch position, compared to when the user touches the touch panel by reaching out his/her arm to the display surface of the display 2 from an oblique angle.

Therefore, when the user touches the touch panel by reaching out his/her arm in a direction that is substantially perpendicular to the display surface of the display 2, in the touch-response process described in the first embodiment, the user in the driver's seat or the user in the passenger's seat cannot be identified as the touching operator, and there is a risk that an unidentified user may be identified as the touching operator.

So, according to the second embodiment, the touching operator is identified based on evaluation values that are determined such that the impact of light beams reflected by the user's hand or finger located close to the display surface of the display 2 is less than the impact of light beams reflected by his/her arm. That is, even when the user touches the touch panel by reaching out his/her arm in a direction that is substantially perpendicular to the display surface of the display 2, evaluation values that indicate relatively large differences with respect to the horizontal coordinate Tx of the touch position are used to identify the touching operator.

Here, the reflected light beams from the user's hand or finger located close to the display surface of the display 2 are detected by the approach detection sensor 31 as reflected light beams of greater intensity, and their evaluation values can be calculated such that the impact of the reflected light beams with greater intensity is minimized within a range in which the magnitude relationship between the respective intensities of light beams is maintained.

To be more specific, the center of gravity G2x, which is determined from the following mathematical expression 2 using intensity signals L1', L2', L3', and L4', obtained by reducing the intensity signals L1, L2, L3, and L4 detected by the approach detection sensor 31 such that a signal of a greater intensity is reduced by a greater rate within a range in which the magnitude relationship between the respective intensities is maintained, can be used as one such evaluation value.

(Mathematical expression 2)

$$G2x =$$
$$(X1 \times L1' + X2 \times L2' + X3 \times L3' + X4 \times L4')/(L1' + L2' + L3' + L4')$$

Also, for example, for the intensity signals L1', L2', L3', and L4', the following signals can be used as well:

$$L1' = L1^{1/2}, L2' = L2^{1/2}, L3' = L3^{1/2}, L4' = L4^{1/2}$$
$$L1' = \log(L1), L2' = \log(L2), L3' = \log(L3), L4' = \log(L4).$$

However, the intensity signals L1', L2', L3' and L4' may be calculated using other methods if Li>Lj, Li'>Lj', and Li'/Li<Lj'/Lj are satisfied. In the second embodiment, the detection control part 323 calculates the evaluation value G2x and provides it to the data processing device 1. Furthermore, in step 504 of the touch-response process shown in FIG. 5, the data processing device 1 obtains the evaluation value G2x, not the approach position Gx, from the approach detection controller 32. Also, in step 506, whether G2x>Tx+Th1 is satisfied is determined. If G2x>Tx+Th1 is satisfied, then, in step 514, the user in the driver's seat is identified as the touching operator. Also, in step 508, whether G2x<Tx−

Th1 is satisfied is determined. If G2$x$<Tx−Th1 is satisfied, then, in step 512, the user in the passenger's seat is identified as the touching operator. Also, if neither G2$x$>Tx+Th1 nor G2$x$<Tx−Th1 is satisfied, then, in step 510, an unidentified user is identified as the touching operator.

This makes it possible to identify the true user as the touching operator, even in cases in which the user touches the touch panel by reaching out his/her arm in a direction that is substantially perpendicular to the display surface of the display 2. The second embodiment of the present invention has been described above. Next, a third embodiment of the present invention will be described. The third embodiment is different from the first embodiment only in the details of the touch-response process. FIG. 9 shows the flow of the touch-response process performed in the third embodiment. As shown in the drawing, in this touch-response process, a touch position (Tx, Ty) is first obtained from the touch panel (step 902). Also, an approach position Gx calculated by the approach detection controller 32 is obtained (step 904). Then, ThD and ThP are set 5 according to the horizontal coordinate Tx of the touch position (step 906). The setting of ThD and ThP will be described later in detail. Then, whether Gx>Tx+ThD is satisfied is determined (step 908). If Gx>Tx+ThD is satisfied (step 908), the user in the driver's seat is identified as the touching operator (step 916). On the other hand, if Gx>Tx+ThD is not satisfied (step 908), then, whether Gx<Tx+ThP is satisfied is determined (step 910). If Gx<Tx+ThP is satisfied (step 910), the user in the passenger's seat is identified as the touching operator (step 914). On the other hand, if Gx<Tx+ThP is not satisfied either (step 910), an unidentified user is identified as the touching operator (step 912). Then, a process is executed according to the touch position (Tx, Ty) and the touching operator identified in one of steps 912, 914, and 916 (step 918). Then, the process returns to step 902. Here, the setting of ThD and ThP in step 906 based on the horizontal coordinate Tx of the touch position will be described. When ThD and ThP are set, XLB and XRB, which are provided in advance, are used such that the following relationship holds between the minimum value Xmin (=0) and the maximum value Xmax of the horizontal coordinate Tx of the touch position:

$$Xmin<XLB<Xmid<XRB<Xmax$$

where Xmid is the midpoint between Xmin and Xmax (the center coordinate in the left-right direction of the touch panel) and represented as "Xmid=(Xmax+Xmin)/2=Xmax/2". Provided that Th1>0, Th2>0, Th3>0, Th2<Th1, Th2<Th3, and Th3>Th1 hold depending on the horizontal coordinate Tx of the touch position, ThD and ThP are determined as follows:

When Xmin≤Tx≤XLB holds, ThD=Th3 and ThP=Th2 hold;

When XLB<Tx<XRB holds, ThD=Th1 and ThP=−Th1 holds; and

When XRB≤Tx≤Xmax holds, ThD=−Th2 and ThP=−Th3 holds.

The reason that ThD and ThP are determined based on the coordinate Tx in this manner is as follows.

As shown in (a) of FIG. 10, when the user in the passenger's seat touches a position near the left edge of the display 2 of the touch panel, the amount of light beams that are reflected by the arm of the user in the passenger's seat and arrive at the approach detection sensor 31 decreases, and light beams that are reflected by the user's hand and finger and arrive at the approach detection sensor 31 are detected predominantly. Consequently, a position around the touch position's horizontal coordinate Tx is calculated as the approach position Gx.

On the other hand, as shown in (b) of FIG. 10, when the user in the driver's seat touches a position near the left edge of the display 2 of the touch panel, the reflection of light beams by the arm of the user in the driver's seat spans a wide range, and the amount of light beams that are reflected by the user's arm and arrive at the approach detection sensor 31 increases. Consequently, a position that is shifted significantly to the right from the touch position's horizontal coordinate Tx is calculated as the approach position Gx.

The same applies when a position near the right edge of the display 2 of the touch panel is touched. When the user in the driver's seat touches the touch panel, the amount of light beams that are reflected by the arm of the user in the driver's seat and arrive at the approach detection sensor 31 decreases, and light beams that are reflected by the user's hand or finger and arrive at the approach detection sensor 31 are detected predominantly. Consequently, a position around the touch position's horizontal coordinate Tx is calculated as the approach position Gx. When the user in the passenger's seat touches the touch panel, the reflection of light beams by the arm of the user in the passenger's seat spans a wide range, and more light beams are reflected by the user's arm and arrive at the approach detection sensor 31. Consequently, a position that is shifted significantly to the left of the touch position's horizontal coordinate Tx is calculated as the approach position Gx.

For this reason, with the touch-response process described in the first embodiment, when a user touches a position on the touch panel near the left edge or the right edge of the display 2, the true touching operator may not be identified. On the other hand, according to the third embodiment, as described above, ThD and ThP are determined based on the coordinate Tx, and the user in the driver's seat is identified as the touching operator if Gx>Tx+ThD is satisfied, while the user in the passenger's seat is identified as the touching operator if Gx<Tx+ThP is satisfied. Consequently, as shown in the examples of (a), (b), and (c) in FIG. 11, given a touch position's horizontal coordinate Tx, the range of the approach position Tx in which the user in the driver's seat is identified as the touching operator, and the range of the approach position Gx in which the user in the passenger's seat is identified as the touching operator are set.

Referring to (b) of FIG. 11, when the touch position's horizontal coordinate Tx is near the left edge of the display 2 (when the horizontal coordinate Tx is within the coordinate range from XLB and below), the user in the passenger's seat is identified as the touching operator if a position around the coordinate Tx or within the range to the left of the coordinate Tx is calculated as the approach position Gx, and the user in the driver's seat is identified as the touching operator if a position relatively far to the right from the coordinate Tx is calculated as the approach position Gx.

Also, referring to (c) of FIG. 11, in the event the touch position's horizontal coordinate Tx is near the right edge of the display 2 (when the horizontal coordinate Tx is within the coordinate range from XRB and above), the user in the driver's seat is identified as the touching operator if a position around the coordinate Tx or within the range to the right of the coordinate Tx is calculated as the approach position Gx, and the user in the passenger's seat is identified as the touching operator if a position relatively far to the left from the coordinate Tx is calculated as the approach position Gx.

Also, if the touch position's horizontal coordinate Tx is found neither in a position that is near to neither the left edge nor the right edge of the display 2, as shown in (a) in FIG. 11, the 5 touching operator is identified in the same manner as in the first embodiment. Therefore, according to the third embodiment, it is possible to identify the true user as the touching operator, including cases in which a position on the touch panel near the left edge or the right edge of the display 2 is touched. The third embodiment of the present invention has been described above. Next, a fourth embodiment of the present invention will be described. The fourth embodiment is different from the third embodiment only in the method of setting ThD and ThP. In the fourth embodiment, ThD and ThP are set such that ThD changes stepwise to Th3, to Th1, and to −Th2, and ThP changes stepwise to Th2, to −Th1, and to −Th3, of following the change of a touch position's horizontal coordinate Tx from Xmin=0 to Xmax. This setting can be achieved by, for example, satisfying $$ThD = Th3 + (Th1 - Th3)\,Tx/Xmid, \text{ and}$$

$$ThP = Th2 + (-Th1 - Th2)\,Tx/Xmid)$$

when the coordinate Tx is located between Xmin and Xmid, and satisfying $$ThD = Th1 + (-Th2 - Th1)\,(Tx - Xmid)/Xmid, \text{ and}$$

$$ThP = -Th1 + (-Th3 + Th1)\,(Tx - Xmid)/Xmid$$

when the coordinate Tx is located between Xmid and Xmax.

Alternatively, ThD and ThP may be set such that ThD changes gradually from Th3 to −Th2 and ThP changes gradually from Th2 to −Th3 following the change of the horizontal coordinate Tx of the touch position from Xmin=0 to Xmax. Such a setting can be realized, for example, by satisfying ThD=Th3+(−Th2−Th3)Tx/Xmax and ThP=Th2+(−Th3−Th2) Tx/Xmax.

Even if ThD and ThP are set thus, as in the third embodiment, the true user can be identified as the touching operator, including when a position on the touch panel near the left edge or the right edge of the display 2 is touched. Embodiments of the present invention have been described above. In the touch-response process in the third and fourth embodiments described above, the evaluation value G2$x$ shown in the second embodiment may be used instead of the approach position Gx.

What is claimed is:

1. A touching operator identification system for identifying a user touching a touch panel, the touch panel being placed on top of a display surface of a display and configured to detect, as a touch position, a position on the touch panel where the user touches, the touching operator identification system comprising:

an approach detection device configured to detect an object approaching the display surface of the display; and a data processor configured to identify the user touching the touch panel, wherein the approach detection device includes:

a plurality of light sources positioned side by side in a left-right direction of the display surface, outside the display surface, and configured to emit non-visible light beams forward with respect to the display surface;

an optical detector configured to detect reflected light beams of the non-visible light beams emitted from the plurality of light sources; and a detection controller configured to calculate, as a reference left-right position, a coordinate of the approaching object on the display surface, with respect to the left-right direction of the display surface, based on a distribution of respective intensities of the reflected light beams of the non-visible light beams detected by the optical detector, and wherein, upon occurrence of a touch event in which the user touches the touch panel, the data processor determines whether the user is a user on a left side of the display or a user on a right side of the display, based on a positional relationship and a distance in the left-right direction of the display surface between:

a touch position in the touch event in the left-right direction of the display surface, the touch position giving a coordinate of the touch position detected by the touch panel, with respect to the left-right direction of the display surface; and the reference left-right position calculated by the detection controller.

2. The touching operator identification system according to claim 1, wherein the data processor is further configured to:

determine that the user is the user on the left side of the display when the reference left-right position is located a predetermined distance or more apart to left from the touch position in the touch event; and determine that the user is the user on the right side of the display when the reference left-right position is located the predetermined distance or more apart to right from the touch position in the touch event.

3. The touching operator identification system according to claim 1, wherein, when the touch position in the touch event in the left-right direction of the display surface is located in a middle area in a left-right direction of the display, the data processor is further configured to:

determine that the user is the user on the left side of the display when the reference left-right position is located a first distance or more apart to left from the touch position in the touch event; and determine that the user is the user on the right side of the display when the reference left-right position is located the first distance or more apart to right from the touch position in the touch event, wherein, when the touch position in the touch event is located in a left part in the middle area of the display, the data processor is further configured to:

determine that the user is the user on the left side of the display when the reference left-right position is located a second distance or more apart to left from the touch position in the touch event; and determine that the user is the user on the right side of the display when the reference left-right position is located a third distance, which is greater than or equal to the second distance, apart from the touch position in the touch event, and wherein, when the user's position is located in a right part in the middle area of the display, the data processor is further configured to:

determine that the user is the user on the left side of the display when the reference left-right position is located the second distance or more apart to right from the touch position in the touch event; and determine that the user is the user on the right side of the display when the reference left-right position is located the third distance or more apart from the touch position in the touch event.

4. The touching operator identification system according to claim 1, wherein the data processor is further configured to:

set a first reference position and a second reference position based on the touch position in the touch event in the left-right direction of the display surface;

determine that the user is the user on the left side of the display when the reference left-right position is located on a left side with respect to the first reference position; and determine that the user is the user on the right side of the display when the reference left-right position is located on a right side with respect to the second reference position, wherein the data processor is further configured to set the first reference position such that:

when a position relative to the touch position in the touch event is defined as a relative position and the touch position in the touch event is located near a left edge of the display, a first relative position that is a first distance apart to right from the touch position in the touch event serves as the relative position;

when the touch position in the touch event is located near a right edge of the display, a second relative position that is a second distance, which is greater than the first distance, apart to right from the touch position in the touch event serves as the relative position; and when the touch position in the touch event is located between the left edge and the right edge of the display, the relative position gets nearer to the first relative position as the relative position gets nearer to the left edge of the display, and gets nearer to the second relative position as the relative position gets nearer to the right edge of the display, and wherein the data processor is further configured to set the second reference position such that:

when the touch position in the touch event is located near the right edge of the display, a third relative position that is the first distance apart to left from the touch position in the touch event serves as the relative position;

when the touch position in the touch event is located near the left edge of the display, a fourth relative position that is the second distance apart to right from the touch position in the touch event serves as the relative position; and when the touch position in the touch event is located between the left edge and the right edge of the display, the relative position gets nearer to the third relative position as the relative position gets nearer to the right edge of the display, and gets nearer to the fourth relative position as the relative position gets nearer to the left edge of the display.

5. The touching operator identification system according to claim 1, wherein the display is located between a driver's seat and a passenger's seat in a car, with respect to a left-right direction of the car, and wherein the user on the left side of the display is one of a user seated in the driver's seat or a user seated in the passenger's seat, and the user on the right side of the display is the other user.

6. An information processing system comprising:

the touching operator identification system of claim 1;

the display; and the touch panel, wherein the data processor is configured to use the display to display an output and use the touch panel to input a position, wherein the touching operator identification system is further configured to report the identified user to the data processor, and wherein the data processor is further configured to perform a process according to the touch position in the touch event detected by the touch panel, and to switch details of at least a part of the process performed according to the touch position in the touch event, depending on the user identified by and reported from the touching operator identification system, to the data processor.

7. An information processing system comprising:

the touching operator identification system of claim 1;

the display; and the touch panel, wherein the data processor is configured to use the display to display an output and use the touch panel to input a position, wherein the touching operator identification system is further configured to report the reference left-right position and the identified user to the data processor, and wherein the data processor is further configured to:

recognize a gesture that the user makes in front of the display surface of the display, from the reference left-right position, and perform a process according to the gesture recognized;

perform a process according to the touch position in the touch event detected by the touch panel; and switch details of at least part of the process performed according to touch position in the touch event, depending on the user identified by and reported from the touching operator identification system, to the data processor.

\* \* \* \* \*